United States Patent
Burckart et al.

(10) Patent No.: US 8,935,809 B2
(45) Date of Patent: Jan. 13, 2015

(54) CONSUMPTION BASED DIGITAL CONTENT RENTAL EXPIRATION

(75) Inventors: Erik J. Burckart, Raleigh, NC (US); Andrew J. Ivory, Wake Forest, NC (US); Aaron K. Shook, Raleigh, NC (US); David M. Stecher, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 13/530,581

(22) Filed: Jun. 22, 2012

(65) Prior Publication Data

US 2013/0347132 A1    Dec. 26, 2013

(51) Int. Cl.
*H04N 7/16*    (2011.01)

(52) U.S. Cl.
USPC .......................................................... 726/30

(58) Field of Classification Search
None
See application file for complete search history.

(56) References Cited

U.S. PATENT DOCUMENTS

| | | | |
|---|---|---|---|
| 7,630,941 B2 | 12/2009 | Berstis | |
| 8,260,657 B1 * | 9/2012 | Conway | 705/7.35 |
| 2005/0108176 A1 | 5/2005 | Jarol et al. | |
| 2007/0300310 A1 | 12/2007 | Molaro | |
| 2008/0195871 A1 | 8/2008 | Peinado et al. | |
| 2008/0270308 A1 | 10/2008 | Peterka et al. | |
| 2009/0157553 A1 | 6/2009 | Wang et al. | |
| 2009/0182670 A1 | 7/2009 | Farrugia et al. | |
| 2009/0193479 A1 | 7/2009 | Briller et al. | |
| 2010/0017506 A1 * | 1/2010 | Fadell | 709/224 |
| 2010/0088716 A1 | 4/2010 | Ellanti et al. | |
| 2010/0180289 A1 | 7/2010 | Barsook et al. | |
| 2011/0110516 A1 | 5/2011 | Satoh | |
| 2011/0247075 A1 * | 10/2011 | Mykland et al. | 726/26 |

OTHER PUBLICATIONS

"Digital Downloads", Warner Bros. Studios, WBshop.com, http://www.wbshop.com/Digital-Download-Explained/ON_DEMAND_FAQ,default,pg.html, retrieved Jun. 22, 2012, 4 pages.
"General Questions about eTextbooks", http://uh-downtown.bncollege.com/eBooks/EBooksFAQ.html, retrieved Jun. 22, 2012, 5 pages.
"New on Rent Digital Movies", Cineplex Store, http://store.cineplex.com/store/department.jsp;jsessionid=254DC5F3D49DDFE6C16B4C182D066254.worker4?resetHideFacets=true&deptId=rentDigital&addFacet=1006%3ADigital-Rent, retrieved Jun. 22, 2012, 1 page.

(Continued)

*Primary Examiner* — Bradon Hoffman
(74) *Attorney, Agent, or Firm* — Francis Lammes; Stephen J. Walder, Jr.; Thomas E. Tyson

(57) ABSTRACT

A mechanism is provided for consumption based digital content rental. Responsive to validating a request from a user to consume the digital content, one or more discrete units of a plurality of discrete units comprised by the digital content are made available to the user. A timer associated with a selected discrete unit is started that records an agreed-to consumption time for the selected discrete unit. The selected discrete unit is presented to the user and then a determination is made as to whether the tinier indicates that the agreed-to consumption time of the selected discrete unit has expired. When the agreed-to consumption time has expired, consumption of the selected discrete unit is ended white leaving each remaining discrete units in the plurality of discrete unit with its own agreed-to consumption time for the user to consume.

22 Claims, 5 Drawing Sheets

(56) References Cited

OTHER PUBLICATIONS

"What about a digital download rental service?", Beyond3D Forum, http://forum.beyond3d.com/showthread.php?t=51845, retrieved Jun. 22, 2012, 14 pages.

Bhatt, Siddharth et al., "A Personal Mobile DRM Manager for Smart-Phones", Stony Brook University, New York, Mar. 3, 2009, 28 pages.

Chapman, Paige, "U. of Michigan Press Tries Short-Term Rental Option for E-Books", The Chronicle of Higher Education, http://chronicle.com/blogPost/blogPost-content/26429/, Aug. 24, 2010, 1 page.

Costello, Sam, "iTunes Movie Rental Frequently Asked Questions", http://ipod.about.com/od/itunesmovierentals/a/Itunes-Movie-Rental-FAQ.htm, Updated Oct. 13, 2011, retrieved Jun. 22, 2012, 2 pages.

Eskicioglu, Ahmet M. et al., "Security of Digital Entertainment Content From Creation to Consumption", Special Issue on Image Security, vol. 18, Issue 4, Apr. 2003, 25 pages.

Kim, Joshua, "An Amazon Digital Book Rental Plan?", Inside Higher Ed, http://www.insidehighered.com/blogs/technology_and_learning/an_amazon_digital_book_rental_plan, Oct. 24, 2010, 5 pages.

Rao, Anita, "Online Content Pricing Purchase and Rental Markets", Stanford University, California, Jun. 27, 2011, 41 pages.

V., Eddie, "iTunes Movies", apple movie junkie, http://www.applemoviejunkie.com/2010/03/17/the-more-you-know-the-itunes-store-movie-rental-usage-rules/, posted Mar. 17, 2010, retrieved Jun. 22, 2012, 3 pages.

\* cited by examiner

CONSUMPTION BASED DIGITAL CONTENT RENTAL EXPIRATION

BACKGROUND

The present application relates generally to an improved data processing apparatus and method and more specifically to mechanisms for consumption based digital content rental expiration.

Current digital content rental models allow users to rent a piece of digital content, such as a movie, music, game, e-book, or the like, for a given length of time. However, one disadvantage to renting the piece of digital content is that a user may be interrupted while they are utilizing the digital content. Then, before the user can finish enjoying the digital content they have paid for, the time associated with the digital content rental has expired, and the user has to re-rent the piece of digital content, which may discourage users from renting such digital content.

SUMMARY

In one illustrative embodiment, a method, in a data processing system, is provided for consumption based digital content rental. The illustrative embodiment receives a request from a user to consume the digital content. Responsive to validating the request, the illustrative embodiment makes one or more discrete units of a plurality of discrete units comprised by the digital content available to the user. Responsive to the user selecting a discrete unit of the one or more discrete units to consume thereby forming a selected discrete unit, the illustrative embodiment starts a timer associated with the selected discrete unit that records an agreed-to consumption time for the selected discrete unit. The illustrative embodiment presents the selected discrete unit to the user. The illustrative embodiment determines whether the timer indicates that the agreed-to consumption time of the selected discrete unit has expired. Responsive to an indication that the agreed-to consumption time has expired, the illustrative embodiment ends consumption of the selected discrete unit. In the illustrative embodiment, the consumption of the selected discrete unit ends the consumption of only the selected discrete unit while leaving each remaining discrete unit in the plurality of discrete units with its own agreed-to consumption time for the user to consume.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide consumption based digital content expiration mechanisms for digital rentals. The mechanisms of the illustrative embodiments orient digital content rentals towards consumption rather than solely being based on length of time. In the illustrative embodiments, the digital content is segmented into two or more discrete units. Only after a user has initiated viewing of one discrete unit is a time started for that discrete unit based on the agreed-to expiration time period. Only once consumption of each discrete unit has started and the time period associated with that discrete unit expires, does that discrete unit expire such that the user is no longer able to view that discrete unit of the digital content.

Figure 1:
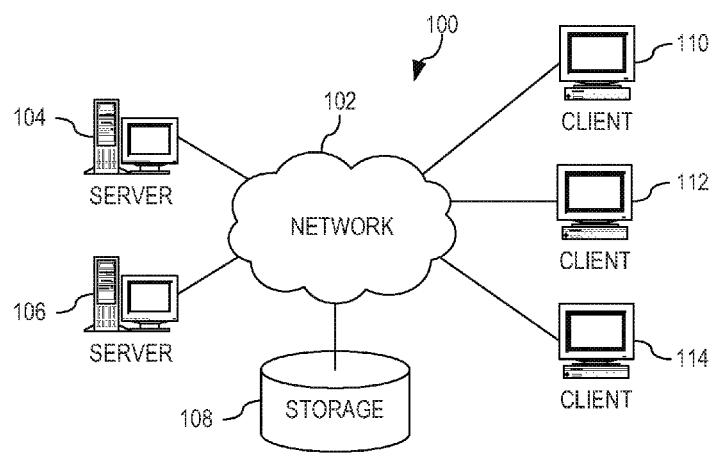
FIG. 1 is an example diagram of a distributed data processing system in which aspects of the illustrative embodiments may be implemented.
Figure 2:
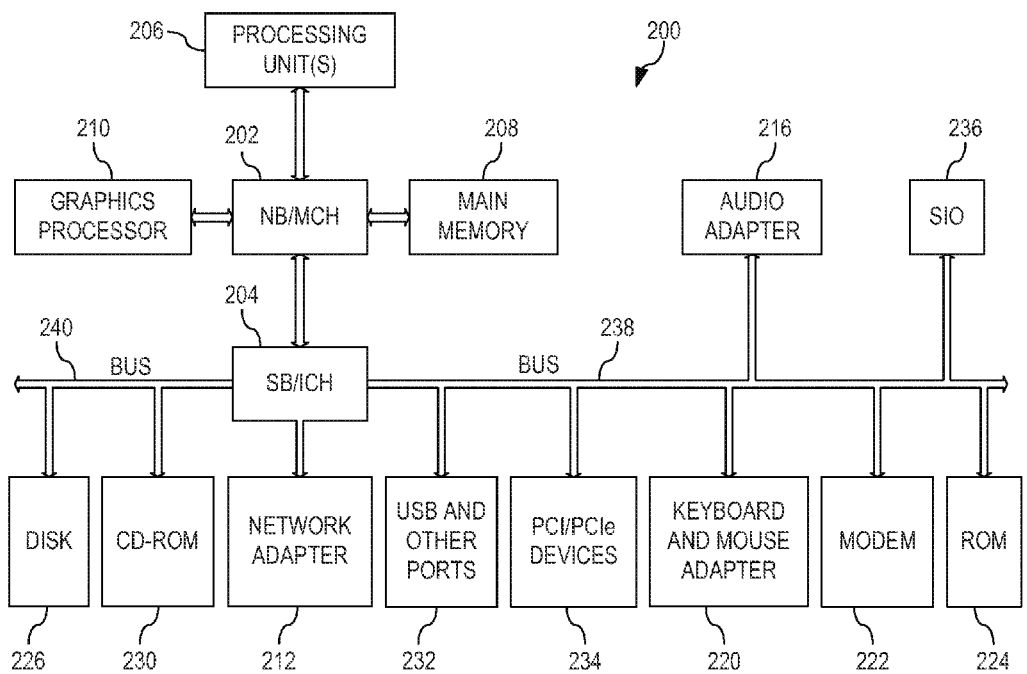
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Again, the illustrative embodiments provide mechanisms that orient digital content rentals towards consumption rather than solely being based on length of time. The illustrative embodiments divide a piece of digital content into two or more discrete units. These discrete units may be, for example, time units, such as seconds, minutes, hours, or the like, or content units, such as pages, chapters, scenes, tracks, levels, or the like. When a user rents a piece of digital content, the mechanism may transfer all or a portion of the digital content to the user's electronic device for consumption. When the user begins consumption of the digital content, such as through viewing a movie, listening to an album, reading a book, playing a game, or the like, the mechanisms start a timer associated with the discrete unit of the piece of digital content that is being consumed. If the user is interrupted such that the consumption of the discrete unit of the digital content is stopped during the time period associated with that discrete unit, only for that discrete unit do the mechanisms continue to elapse the associated time. Thus, all other discrete units where consumption has not been initiated are still available to the user for the agreed-to time period.

Figure 3:
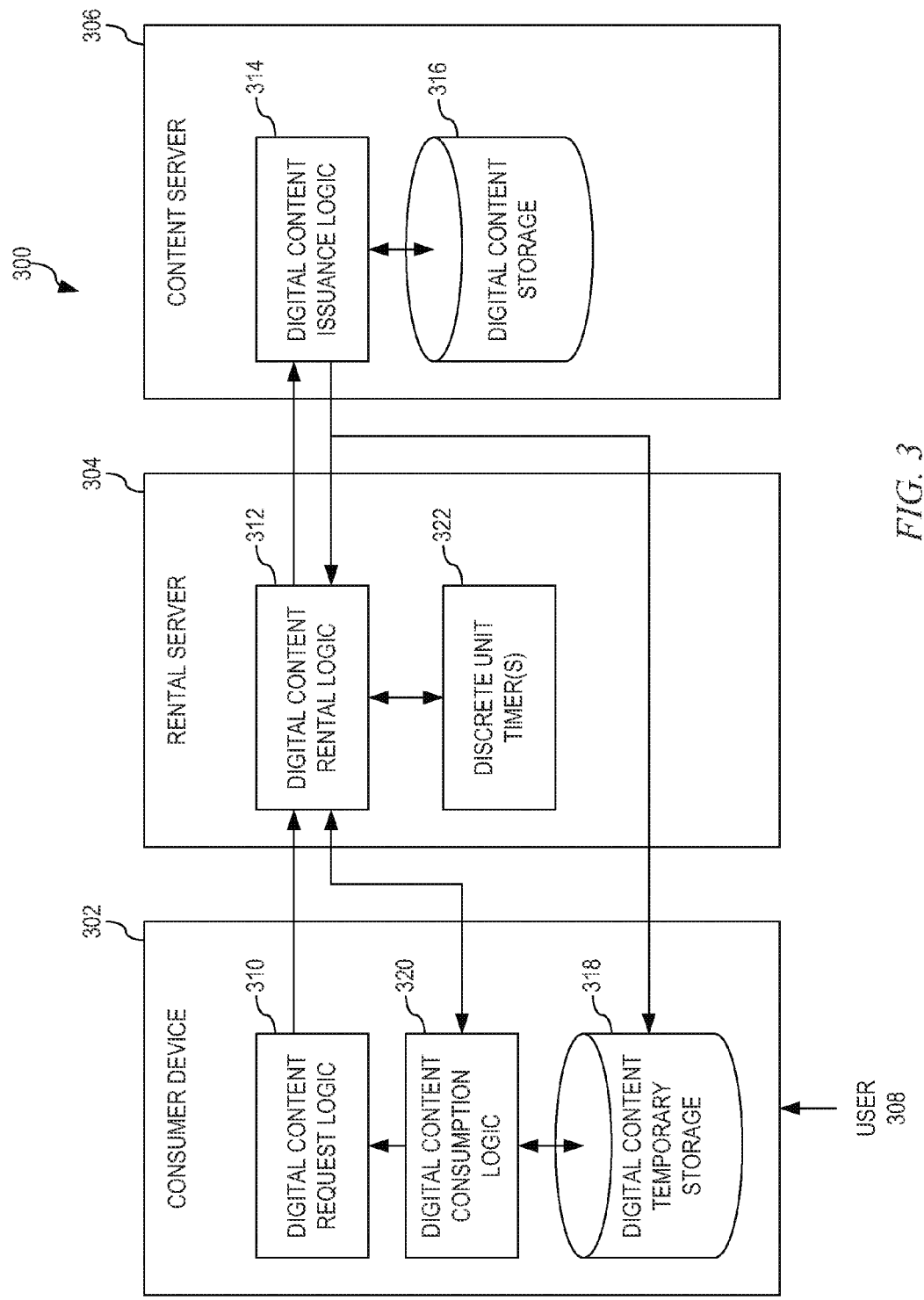
FIG. 3 depicts a functional block diagram of a mechanism for consumption based digital content rental in accordance with an illustrative embodiment.

FIG. 3 depicts a functional block diagram of a mechanism for consumption based digital content rental in accordance with an illustrative embodiment. Consumption based digital content rental mechanism 300 comprises consumer device 302, rental server 304, and content server 306. The configuration depicted in FIG. 3 is solely for a logical understanding of the digital content rental mechanism. However, the illustrative embodiments are not limited to only this depiction as one of ordinary skill in the art will recognize that one or more of the components may perform the operations of the illustrative embodiments from a single device or multiple devices without departing from the spirit and scope of the invention.

When user 308 requests access to digital content, digital content request logic 310 in consumer device 302 receives the request for the digital content and forwards the request to digital content rental logic 312 in rental server 304. Digital content rental logic 312 receives the request, validates user 308 as being a valid user and thus a valid request, and sends an authorization to digital content issuance logic 314 in content server 306. Digital content issuance logic 314 retrieves one or more discrete units of a plurality of discrete units that make up the requested digital content from digital content repository 316 and sends the one or more discrete units to digital content temporary storage 318 in consumer device 302. Digital content issuance logic 314 may send only one discrete unit of a plurality of discrete units that make up the digital content, send two or more discrete units but not the entirety of the plurality of discrete units that make up the digital content, or all of the plurality of discrete units that make up the digital content.

Upon the one or more discrete units of the requested digital content being stored in digital content temporary storage 318 in consumer device 302, digital content consumption logic 320 notifies user 308 that one or more discrete units of the requested digital content is available for consumption. Upon a selection by user 308 to consume one discrete unit of the one or more discrete units, digital content consumption logic 320 presents the discrete unit to user 308 through the user of a video device, audio device, and/or other presentation device coupled to consumer device 302. Once digital content consumption logic 320 initiates the consumption of the discrete unit, digital content consumption logic 320 sends a notification to digital content rental logic 312. By receiving the notification, digital content rental logic 312 initiates one of discrete unit timers 322 set to the agreed upon time period agreed to by user 308 for the discrete unit. The timer may be a countdown timer which counts down to the expiration of the time period or a stopwatch timer that counts up to the expiration of the time period.

If user's 308 consumption of the discrete unit is in some way interrupted, user 308 still has the remainder of the time period in which to consume the discrete unit. Thus, if user 308 attempts to consume a discrete unit where consumption has already been initiated at least once and where digital content rental logic 312 has already started one of discrete unit timers 322 set to the agreed upon time period, then prior to initiating the consumption of the previously initiated discrete unit, digital content consumption logic 320 sends a request for timer period verification to digital content rental logic 312. Digital content rental logic 312 verities the time remaining in the agreed to time period as recorded by the associated discrete unit timer 322. If there is time remaining within the agreed to time period, then digital content rental logic 312 authorizes digital content consumption logic 320 to present the discrete unit to user 308. However, if there is no time remaining within the agreed to time period, then digital content rental logic 312 signals digital content consumption logic 320 to inform user 308 that the time period associated with the discrete unit has expired. Further, if at any time during consumption of the discrete unit, digital content rental logic 312 determines that the agreed to time period associated with the discrete unit has expired, then digital content rental logic 312 sends a signal to digital content consumption logic 320 to either: end consumption of the discrete unit; inform digital content consumption logic 320 to allow user 308 to continue consumption until such time user 308 interrupts consumption of the discrete unit or consumption of the discrete unit ends; or determine whether consumption of the discrete unit is over a predetermined percentage complete and, if so, allow the user to continue consumption until such time user 308 interrupts consumption of the discrete unit or consumption of the discrete unit ends or, if not, end consumption of the discrete unit. Nevertheless, once the time period associated with the discrete unit has expired and user 308 is no longer consuming the discrete unit, digital content consumption logic 320 prevents the user from consuming only the discrete unit of the digital content where consumption has been initiated and the time period has expired.

As stated previously, digital content issuance logic 314 may send only one discrete unit of a plurality of discrete units that make up the digital content, send two or more discrete units but not the entirety of the plurality of discrete units that make up the digital content, or all of the plurality of discrete units that make up the digital content. Therefore, if digital content issuance logic 314 has sent only one discrete unit and so as not to impede user 308 consumption of the digital content, once digital content consumption logic 320 determines that the presentation of the one discrete unit reaches a predetermined location near the end of the discrete unit, digital content consumption logic 320 may send a signal to digital content rental logic 312 to request the next discrete unit from digital content issuance logic 314. Digital content rental logic 312 validates user 308 as being a valid user and sends authorization to digital content issuance logic 314. Digital content issuance logic 314 retrieves the next discrete unit of a plurality of discrete units that make up the digital content from digital content repository 316 and sends the next discrete unit to digital content temporary storage 318 in consumer device 302.

In an alternative embodiment, if digital content issuance logic 314 has sent two or more discrete units but not the entirety of the plurality of discrete units that make up the digital content, then digital content consumption logic 320 may determine whether the remaining unconsumed discrete units meets a predetermined number of unconsumed discrete units. If digital content consumption logic 320 determines that the remaining unconsumed discrete units is less that the predetermined number of unconsumed discrete units and there are more discrete units in the plurality of discrete units yet to be consumed, then digital content consumption logic 320 may send a signal to digital content rental logic 312 to request the next one or more discrete units from digital content issuance logic 314. Digital content rental logic 312 validates user 308 as being a valid user and sends authorization to digital content issuance logic 314. Digital content issuance logic 314 retrieves the next one or more discrete units of a plurality of discrete units that make up the digital content from digital content repository 316 and sends the next one or more discrete units to digital content temporary storage 318 in consumer device 302.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4A:
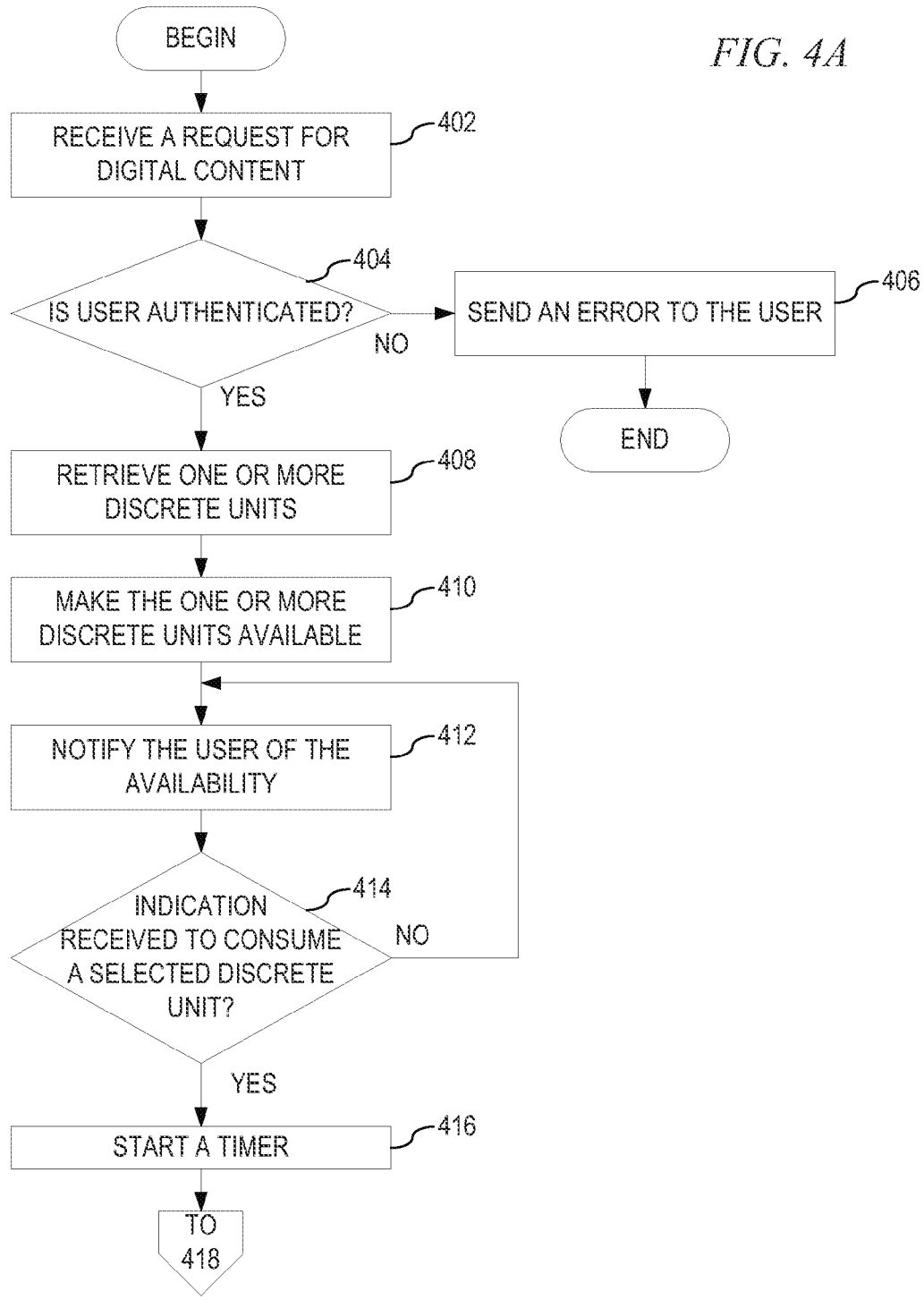
FIGS. 4A and 4B depicts a flow diagram of the operation performed by a digital content rental mechanism in accordance with an illustrative embodiment.
Figure 4B:
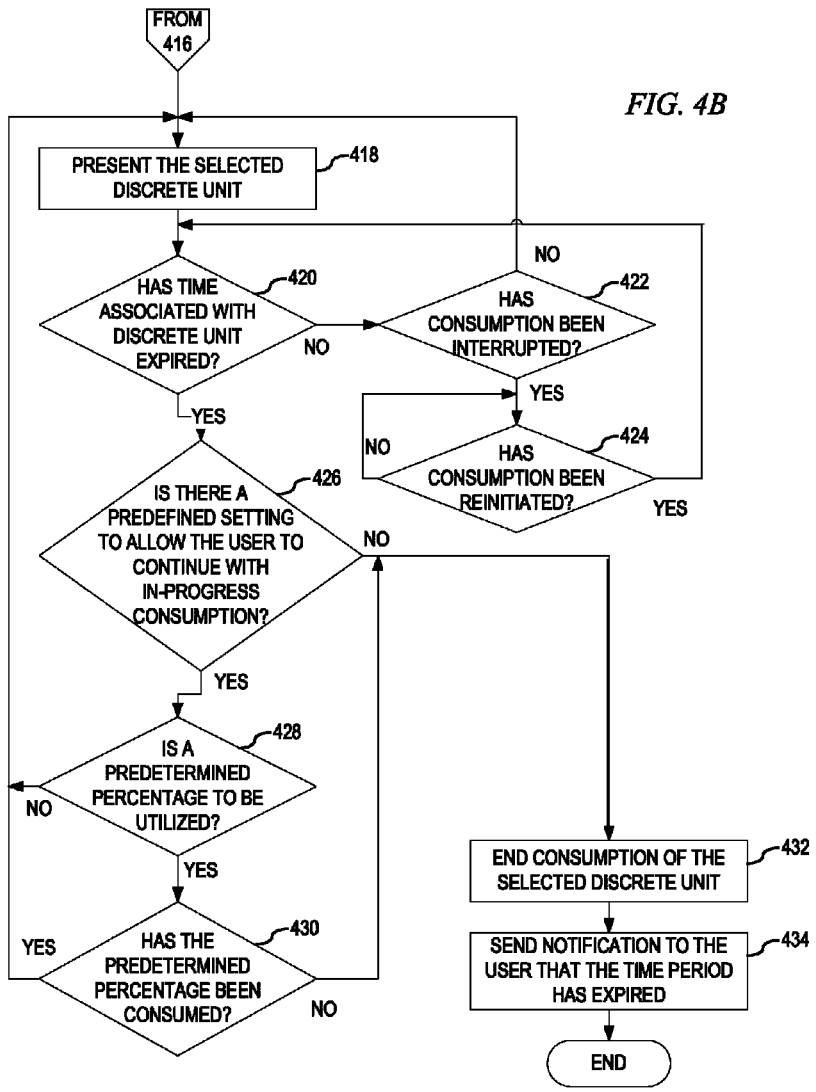

FIGS. 4A and 4B depicts a flow diagram of the operation performed by a digital content rental mechanism in accordance with an illustrative embodiment. As the operation begins, the digital content rental mechanism, executed by a processor, receives a request for digital content (step 402). The digital content rental mechanism then authenticates a user that sent the request (step 404). If at step 404 the user is not authenticated, then the digital content rental mechanism sends an error to the user (step 406), and the operation terminates thereafter. However, if at step 404 the user is authenticated, then the digital content rental mechanism retrieves one or more discrete units of a plurality of discrete units that make up the requested digital content from a digital content repository (step 408).

The digital content rental mechanism makes the one or more discrete units available for the user to consume (step 410) and notifies the user of the availability (step 412). The digital content rental mechanism then determines if the user has provided an indication to consume a selected discrete unit in the one or more discrete units of the requested digital content (step 414). If at step 414 the user fails to provide an indication to consume the selected discrete unit, then the operation returns to step 412. However, if at step 414 the user provides an indication to consume the selected discrete unit, then the digital content rental mechanism starts a timer that will indicate when a time period associated with the consumption of the selected discrete unit expires (step 416). The digital content rental mechanism then presents the selected discrete unit to the user (step 418).

The digital content rental mechanism then determines whether the time associated with the selected discrete unit has expired (step 420). If at step 420 the digital content rental mechanism determines that the time has not expired, then the digital content rental mechanism determines whether the consumption of the selected discrete unit has been interrupted (step 422). If at step 422 the digital content rental mechanism determines that the consumption has not been interrupted, then the operation returns to step 418. If at step 422 the digital content rental mechanism determines that consumption has been interrupted, then the digital content rental mechanism determines whether consumption has been reinitiated (step 424). If at step 424 the digital content rental mechanism determines that consumption of the selected discrete unit has not been reinitiated, then the operation returns to step 424. If at step 424 the digital content rental mechanism determines that consumption has been reinitiated, then the operation proceeds to step 420.

If at step 420 the digital content rental mechanism determines that the time associated with the selected discrete unit has expired, then the digital content rental mechanism determines whether there is a predefined setting to allow the user to continue consuming an in-progress consumption (step 426). If at step 426 the digital content rental mechanism determines that there is a preference to allow in-progress consumption, then the digital content rental mechanism determines whether the preference is to allow consumption only if a predetermined percentage of the selected discrete unit has been consumed (step 428). If at step 428 the digital content rental mechanism determines that the preference is to allow consumption only if a predetermined percentage of the selected discrete unit has been consumed, then the digital content rental mechanism determines whether the predetermined percentage has been consumed (step 430).

If at step 430 the digital content rental mechanism determines that the predetermined percentage has been consumed, then the operation returns to step 418. If at step 430 the digital content rental mechanism determines that the predetermined percentage has not been consumed, then the digital content rental mechanism ends the consumption of the selected discrete unit (step 432) and sends a notification to the user that the time period has expired (step 434), with the operation terminating thereafter.

If at step 428 the digital content rental mechanism determines that preference is to allow in-progress consumption regardless of the percentage of consumption, then the operation returns to step 418. If at step 426 the digital content rental mechanism determines that there is no preference to allow in-progress consumption, then the operation proceeds to step 432.

Figure 5:
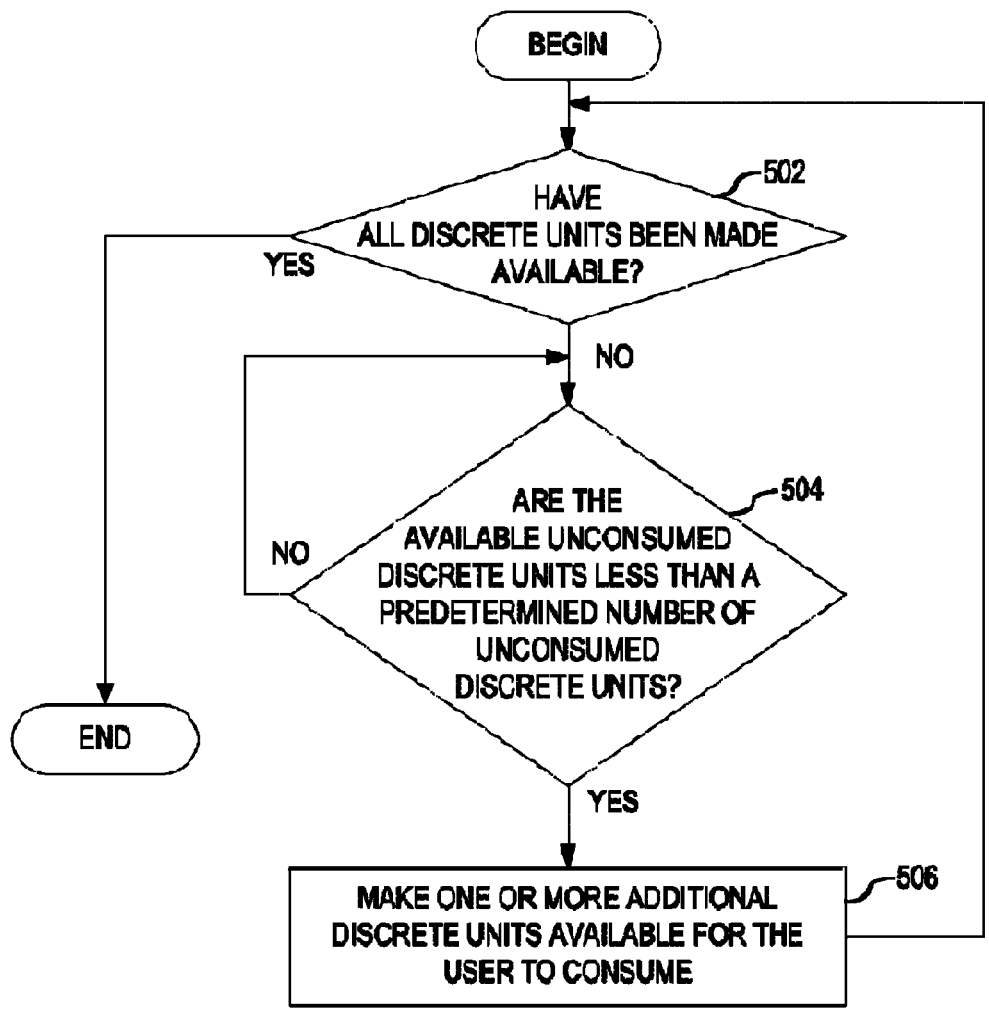
FIG. 5 depicts a flow diagram of the operation performed by a digital content rental mechanism in retrieving additional discrete units of a plurality of discrete units associated with a requested digital content in accordance with an illustrative embodiment.

FIG. 5 depicts a flow diagram of the operation performed by a digital content rental mechanism in retrieving additional discrete units of a plurality of discrete units associated with a requested digital content in accordance with an illustrative embodiment. As the operation begins, a digital content rental mechanism, executed by a processor, determines whether all discrete units in the plurality of discrete units associated with a requested digital content have been made available for the user to consume (step 502). If at step 502 the digital content rental mechanism determines that all discrete units associated with the requested digital content have been made available for the user to consume, then the operation terminates. If at step 502 the digital content rental mechanism determines that not all of the discrete units associated with the requested digital content have been made available for the user to consume, then the digital content rental mechanism determines whether unconsumed discrete units made available for the user to consume are less than a predetermined number of unconsumed discrete units that should be available (step 504). If at step 504 the digital content rental mechanism determines that the unconsumed discrete units made available for the user to consume are more than or equal to the predetermined number of unconsumed discrete units that should be available, then the operation returns to step 504. If at step 504 the digital content rental mechanism determines that the unconsumed discrete units made available for the user to consume are less than the predetermined number of unconsumed discrete units that should be available, then the digital content rental mechanism makes one or more additional discrete units available for the user to consume (step 506), with the operation retuning to step 502 thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart, illustration, can be implemented by special purpose hardware-based systems that perform the specified functions or acts, or combinations of special purpose hardware and computer instructions.

Thus, the illustrative embodiments provide mechanisms for consumption based digital content rental expiration. The mechanisms of the illustrative embodiments orient content rentals towards consumption rather than solely being based on length of time. In the illustrative embodiments, the digital content is segmented into two or more discrete units. Only after a user has initiated viewing of one discrete unit is a time started for that discrete unit based on the agreed-to expiration time period. Only once each discrete unit is viewed in its entirety and the time period associated with that discrete unit expires, does that discrete unit expire such that the user is no longer able to view that discrete unit of the digital content.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for consumption based digital content rental, the method comprising:
    receiving, by a processor, a request from a user to consume the digital content;
    responsive to validating the request, making, by the processor, one or more discrete units of a plurality of discrete units comprised by the digital content available to the user;
    responsive to the user selecting a discrete unit of the one or more discrete units to consume thereby forming a selected discrete unit, starting, by the processor, a timer associated with the selected discrete unit that records an agreed-to consumption time for the selected discrete unit;
    presenting, by the processor, the selected discrete unit to the user;
    determining, by the processor, whether the timer indicates that the agreed-to consumption time of the selected discrete unit has expired; and
    responsive to an indication that the agreed-to consumption time has expired, ending, by the processor, consumption of the selected discrete unit, wherein ending the consumption of the selected discrete unit ends the consumption of only the selected discrete unit while leaving each remaining discrete unit in the plurality of discrete units with its own agreed-to consumption time for the user to consume.

2. The method of claim 1, further comprising:
    responsive to receiving the indication that the agreed-to consumption time has expired, determining, by the processor, whether there is a predefined setting to allow the user to continue consuming an in-progress consumption of the selected discrete unit; and
    responsive to the absence of the predefined setting to allow the user to continue consuming the in-progress consumption of the selected discrete unit, ending, by the processor, consumption of the in-progress consumption of the selected discrete unit.

3. The method of claim 2, further comprising:
    responsive to the presence of the predefined setting to allow the user to continue consuming the in-progress consumption of the selected discrete unit, determining, by the processor, whether there is a predetermined percentage of the in-progress consumption of the selected discrete unit that should be utilized;
    responsive to the predetermined percentage of the in-progress consumption of the selected discrete unit that is being utilized, determining, by the processor, whether the percentage of the in-progress consumption has been met; and
    responsive to the percentage of the in-progress consumption being met, allowing, by the processor, the user to continue consuming the in-progress consumption of the selected discrete unit.

4. The method of claim 3, further comprising:
    responsive to the percentage of the in-progress consumption failing to be met, ending, by the processor, consumption of the in-progress consumption of the selected discrete unit.

5. The method of claim 3, further comprising:
    responsive to the predetermined percentage of the in-progress consumption of the selected discrete unit that is failing to be utilized, allowing, by the processor, the user to continue consuming the in-progress consumption of the selected discrete unit.

6. The method of claim 1, further comprising:
    upon consumption by the user of a predefined percentage of the selected discrete unit, determining, by the processor, whether all of the discrete units in the plurality of discrete units have been made available to the user;
    responsive to not all of the discrete units in the plurality of discrete units being made available to the user, determining, by the processor, whether a predetermined number of unconsumed discrete units have been made available to the user; and
    responsive to the predetermined number of the unconsumed discrete units being made available to the user, waiting, by the processor, for another discrete unit in the unconsumed discrete units to be consumed by the user.

7. The method of claim 6, further comprising:
    responsive to the predetermined number of the unconsumed discrete units failing to have been made available to the user, making, by the processor, one or more additional unconsumed discrete units available to the user.

8. The method of claim 1, wherein each of the one or more discrete units is one of a time unit or a content unit, wherein the time unit is at least one of a second, a minute, a hour, or a day, and wherein the content unit is at least one of a page, a chapter, a scene, a track, or a level.

9. A computer program product comprising a non-transitory computer readable storage medium having a computer readable program stored therein, wherein the computer readable program, when executed on a computing device, causes the computing device to:
    receive a request from a user to consume digital content;
    responsive to validating the request, make one or more discrete units of a plurality of discrete units comprised by the digital content available to the user;
    responsive to the user selecting a discrete unit of the one or more discrete units to consume thereby forming a selected discrete unit, start a timer associated with the selected discrete unit that records an agreed-to consumption time for the selected discrete unit;
    present the selected discrete unit to the user;
    determine whether the timer indicates that the agreed-to consumption time of the selected discrete unit has expired; and
    responsive to an indication that the agreed-to consumption time has expired, end consumption of the selected discrete unit, wherein ending the consumption of the selected discrete unit ends the consumption of only the selected discrete unit while leaving each remaining discrete unit in the plurality of discrete units with its own agreed-to consumption time for the user to consume.

10. The computer program product of claim 9, wherein the computer readable program further causes the computing device to:
    responsive to receiving the indication that the agreed-to consumption time has expired, determine whether there is a predefined setting to allow the user to continue consuming an in-progress consumption of the selected discrete unit; and responsive to the absence of the predefined setting to allow the user to continue consuming the in-progress consumption of the selected discrete unit, end consumption of the in-progress consumption of the selected discrete unit.

11. The computer program product of claim 10, wherein the computer readable program further causes the computing device to:

responsive to the presence of the predefined setting to allow the user to continue consuming the in-progress consumption of the selected discrete unit, determine whether there is a predetermined percentage of the in-progress consumption of the selected discrete unit that should be utilized;

responsive to the predetermined percentage of the in-progress consumption of the selected discrete unit that is being utilized, determine whether the percentage of the in-progress consumption has been met; and responsive to the percentage of the in-progress consumption being met, allow the user to continue consuming the in-progress consumption of the selected discrete unit.

12. The computer program product of claim 11, wherein the computer readable program further causes the computing device to:

responsive to the percentage of the in-progress consumption failing to be met, end consumption of the in-progress consumption of the selected discrete unit.

13. The computer program product of claim 11, wherein the computer readable program further causes the computing device to:

responsive to the predetermined percentage of the in-progress consumption of the selected discrete unit that is failing to be utilized, allow the user to continue consuming the in-progress consumption of the selected discrete unit.

14. The computer program product of claim 9, wherein the computer readable program further causes the computing device to:

upon consumption by the user of a predefined percentage of the selected discrete unit, determine whether all of the discrete units in the plurality of discrete units have been made available to the user;

responsive to not all of the discrete units in the plurality of discrete units being made available to the user, determine whether a predetermined number of unconsumed discrete units have been made available to the user; and responsive to the predetermined number of the unconsumed discrete units being made available to the user, wait for another discrete unit in the unconsumed discrete units to be consumed by the user.

15. The computer program product of claim 14, wherein the computer readable program further causes the computing device to:

responsive to the predetermined number of the unconsumed discrete units failing to have been made available to the user, make one or more additional unconsumed discrete units available to the user.

16. An apparatus, comprising:
a processor; and
a memory coupled to the processor, wherein the memory comprises instructions which, when executed by the processor, cause the processor to:

receive a request from a user to consume digital content;

responsive to validating the request, make one or more discrete units of a plurality of discrete units comprised by the digital content available to the user;

responsive to the user selecting a discrete unit of the one or more discrete units to consume thereby forming a selected discrete unit, start a timer associated with the selected discrete unit that records an agreed-to consumption time for the selected discrete unit;

present the selected discrete unit to the user;

determine whether the timer indicates that the agreed-to consumption time of the selected discrete unit has expired; and responsive to an indication that the agreed-to consumption time has expired, end consumption of the selected discrete unit, wherein ending the consumption of the selected discrete unit ends the consumption of only the selected discrete unit while leaving each remaining discrete unit in the plurality of discrete units with its own agreed-to consumption time for the user to consume.

17. The apparatus of claim 16, wherein the instructions further cause the processor to:

responsive to receiving the indication that the agreed-to consumption time has expired, determine whether there is a predefined setting to allow the user to continue consuming an in-progress consumption of the selected discrete unit; and responsive to the absence of the predefined setting to allow the user to continue consuming the in-progress consumption of the selected discrete unit, end consumption of the in-progress consumption of the selected discrete unit.

18. The apparatus of claim 17, wherein the instructions further cause the processor to:

responsive to the presence of the predefined setting to allow the user to continue consuming the in-progress consumption of the selected discrete unit, determine whether there is a predetermined percentage of the in-progress consumption of the selected discrete unit that should be utilized;

responsive to the predetermined percentage of the in-progress consumption of the selected discrete unit that is being utilized, determine whether the percentage of the in-progress consumption has been met; and responsive to the percentage of the in-progress consumption being met, allow the user to continue consuming the in-progress consumption of the selected discrete unit.

19. The apparatus of claim 18, wherein the instructions further cause the processor to:

responsive to the percentage of the in-progress consumption failing to be met, end consumption of the in-progress consumption of the selected discrete unit.

20. The apparatus of claim 18, wherein the instructions further cause the processor to:

responsive to the predetermined percentage of the in-progress consumption of the selected discrete unit that is failing to be utilized, allow the user to continue consuming the in-progress consumption of the selected discrete unit.

21. The apparatus of claim 16, wherein the instructions further cause the processor to:

upon consumption by the user of a predefined percentage of the selected discrete unit, determine whether all of the discrete units in the plurality of discrete units have been made available to the user;

responsive to not all of the discrete units in the plurality of discrete units being made available to the user, determine whether a predetermined number of unconsumed discrete units have been made available to the user; and responsive to the predetermined number of the unconsumed discrete units being made available to the user, wait for another discrete unit in the unconsumed discrete units to be consumed by the user.

22. The apparatus of claim 21, wherein the instructions further cause the processor to:

responsive to the predetermined number of the unconsumed discrete units failing to have been made available to the user, make one or more additional unconsumed discrete units available to the user.

* * * * *